United States Patent [19]

Blank et al.

[11] Patent Number: 6,015,865
[45] Date of Patent: *Jan. 18, 2000

[54] HOT MELT ADHESIVE FROM EPOXY RESIN/AMINE-TERMINATED POLYALKYLENE GLYCOL ADDUCT

[75] Inventors: Norman E. Blank, Heidelberg; Hubert K. Schenkel, Sandhausen, both of Germany

[73] Assignee: Henkel-Teroson GmbH, Heidelberg, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/956,766

[22] Filed: Oct. 22, 1997

Related U.S. Application Data

[63] Continuation of application No. 07/721,045, Jun. 26, 1991, abandoned.

[51] Int. Cl.$^7$ .............................. C08G 59/14; C08L 63/02; C09J 163/02
[52] U.S. Cl. ............................ 525/524; 156/330; 523/428
[58] Field of Search ................................ 525/407, 504, 525/524; 428/418; 156/330; 523/428

[56] References Cited

U.S. PATENT DOCUMENTS

| | | | |
|---|---|---|---|
| 3,926,904 | 12/1975 | Scola | 260/836 |
| 4,077,927 | 3/1978 | McPherson | 525/524 |
| 4,119,615 | 10/1978 | Schulze | 525/435 |
| 4,133,803 | 1/1979 | Klein | 525/435 |
| 4,141,885 | 2/1979 | Waddill | 525/523 |
| 4,187,367 | 2/1980 | Waddill | 525/507 |
| 4,423,170 | 12/1983 | Waddill | 528/98 |
| 4,485,229 | 11/1984 | Waddill et al. | 525/504 |
| 4,507,340 | 3/1985 | Rinde et al. | 428/418 |
| 4,507,363 | 3/1985 | Chow et al. | 528/99 |
| 4,554,297 | 11/1985 | Dabi | 528/111 |
| 4,728,384 | 3/1988 | Goel | 525/524 |
| 4,734,468 | 3/1988 | Marx | 525/524 |
| 4,940,770 | 7/1990 | Speranza et al. | 528/111 |
| 4,977,214 | 12/1990 | Bagga | 525/109 |
| 4,992,590 | 2/1991 | Cuscurida et al. | 564/475 |
| 5,025,068 | 6/1991 | Garcia et al. | 525/524 |
| 5,030,698 | 7/1991 | Mülhavpt et al. | 525/423 |
| 5,084,532 | 1/1992 | Schenkel | 525/524 |
| 5,218,063 | 6/1993 | Kimball | 525/532 |

FOREIGN PATENT DOCUMENTS

| | | |
|---|---|---|
| 2355561 | 5/1975 | Germany . |
| 0094739 | 9/1974 | Japan . |
| 0082326 | 7/1976 | Japan . |
| 56-120726 | 9/1981 | Japan . |
| 63-119880 | 5/1988 | Japan . |
| 3308026 | 12/1988 | Japan . |
| 1-87667 | 3/1989 | Japan . |

*Primary Examiner*—Robert E. Sellers
*Attorney, Agent, or Firm*—Ernest G. Szoke; Wayne C. Jaeschke; Stephen D. Harper

[57] ABSTRACT

A reactive hot melt adhesive contains, as resin component, a reaction product of a) 30 to 50 wt-% of an epoxy resin, solid at root temperature, prepared from bisphenol A and/or bisphenol F and epichlorhydrin with an epoxide equivalent weight of 400 to 700, b) 10 to 25 wt-% of an epoxy resin, liquid at room temperature, prepared from bisphenol A and/or bisphenol F and epichlorhydrin with an epoxide equivalent weight of 150 to 220 and c) 35 to 50 wt-% amino-terminated polyethylene and/or polypropylene glycols.

8 Claims, No Drawings

HOT MELT ADHESIVE FROM EPOXY RESIN/AMINE-TERMINATED POLYALKYLENE GLYCOL ADDUCT

This application is a continuation, of application Ser. No. 07/721,045 filed on Jun. 26, 1991, abandoned.

FIELD OF THE INVENTION

The invention relates to a reactive hot melt adhesive which contains one or more epoxy resin components, at least one thermally activatable latent curing agent for the resin component and optionally accelerators, fillers, thixotropic agents and further usual additives. The invention further relates to a process for preparing the reactive hot melt adhesive and the use thereof.

BACKGROUND OF THE INVENTION

Hot melt adhesives of the above mentioned type are known per se. For example, reactive hot melt adhesives based on epoxy resins are used in the car industry. These known: epoxy adhesives are, however, not very flexible in the cured state. The glueings obtained with them admittedly display a high tensile strength, but easily crack as a result of peeling under traverse stress. It is a known problem that adhesives with which high tensile shearing strengths can be achieved often provide only a low level of T-peel strength.

In the car industry, a frequent procedure when glueing sheet metal is firstly to apply the adhesive in a warm, but not yet cured state. Upon cooling, the adhesive sets and, accompanied by the formation of adequate handling strength, provides a provisional bond. The sheets thus bonded to each other are treated in washing, parkerizing and dip-coating baths. Only then is the adhesive cured in an oven. Therefore a need exists for hot melt adhesives which already display an adequate wash-out resistance prior to curing.

It is known from DE-A-32 02 300 to add polyols to epoxy resins to increase their flexibility. Epoxy resins modified with alcohols are described in DE-A-34 09 188. Known from EP-A-01 30 741 are polyoxypropylene amines or amino-terminated polypropylene glycols (ATPPG) and their use as curing agents for epoxy resins.

In DE-C-26 59 928 and DE-C-26 59 989 aqueous dispersions are described which contain epoxy resins and dicyanodiamide as curing agents. The aqueous dispersions are used as coating agent. However, high tensile shearing and T-peel strengths are not relevant with coating agents.

It is known from DE-A-38 27 626 to improve the flexibility of reactive hot melt adhesives based on epoxy resin by adding a linear polyoxypropylene with amino end-groups during the preparation of the resin component. In this way an improvement of the properties is achieved, particularly of the flexibility and of the peel strength. However, the properties at low temperatures down to −40° C. in particular are still not satisfactory. For example, in the winter it is not rare for motor vehicles to be exposed to temperatures far below 0° C.

SUMMARY OF THE INVENTION

The object of the present invention is to improve reactive hot melt adhesives of the initially mentioned type so that they display an adequate flexibility and an increased peel strength not only at room temperature but also at low temperatures below 0° C. The improvement is to be achieved without impairing the tensile shearing strength. Furthermore, the reactive hot melt adhesives are to have an adequate wash-out resistance prior to curing.

The object is achieved according to the invention by a reactive hot melt adhesive according to claim 1. The epoxy resin component is obtained by reacting a) an epoxy resin which is solid at room temperature and
b) an epoxy resin which is liquid at room temperature with
c) linear amino-terminated polyethylene glycols (ATPEG) or linear and/or trifunctional amino-terminated polypropylene glycols (ATPPG), the epoxy resins a) and b) being used in such a quantity that an excess of epoxide groups over the amino groups is ensured.

At this point mention is made that the components a), b) and c) can, in each case, also be mixtures of compounds of; the given type.

This reaction product can be modified by adding other modified epoxy resins such as i) adducts of dimeric fatty acids having varying molecular weights with epoxy resins of the diglycidyl ether type of bisphenol A or F (DGEBA or DGEBF) (e.g. Epikote® or EPON® 872),
ii) adducts of carboxyl-terminated butadiene-nitrile rubber (CTBN) (Hycar® 1300X8, 1300X13; Struktol®) with DGEBA or DGEBF so that, even at high temperatures (up to +90° C.) and under ageing conditions (corrosion, moisture), it exhibits permanent strength. Preferably 4 to 40, particularly 5 to 25, e.g. 20% of the epoxide equivalents (EEW) of the total epoxy resin component may be replaced by such adducts.

With high tensile shearing strength, the adhesive according to the invention leads at the same time to high T-peel and impact feel strength in the temperature range of −40° C. to +90° C. In the cured state it displays the degree of flexibility which is necessary especially in the manufacture of cars. The flexibility of the resin matrix can be set by using ATPEG or ATPPG of varying functionality (bi- or trifunctional) and variable chain-length, and by varying the ratio of ATPEG/ATPPG to epoxy resin.

With increasing chain-length of the ATPEG or ATPPG, the flexibility of the resin matrix increases. The addition of further flexibilizing epoxy resins produces adequate operational strength of a glued component even at high temperature. Thanks to the hydrophobic structure of the further resin components (epoxide/dimeric acid adducts or epoxide/butadiene-nitrile rubber adducts), the ageing behavior of the compounded adhesives is also favourably influenced.

The hardness of the reactive hot melt adhesive in the cold state, i.e. particularly after deposition but before curing, depends on the ratio of solid epoxy resin a) to liquid epoxy resin b). The greater the proportion of solid epoxy resin, the harder the cold, semi-crystalline hot melt adhesive.

When reacting the epoxy resins with the ATPEG/ATPPG, an excess of epoxy groups over the amino groups is used so that the latter react completely with epoxide groups. Typically, there is a 1.5 to 10-fold excess, for example a 3.5-fold excess of EEW over the active hydrogen equivalents (AHEW) of the amines.

DETAILED DESCRIPTION OF THE INVENTION

An epoxy resin is used which is obtainable from bisphenol A or bisphenol F and epichlorhydrin. Epoxy resin a) must display a sufficiently high molecular weight for it to be solid at room temperature. According to the invention this resin has an epoxide equivalent weight of >400, preferably of 450 to 550.

The epoxy resin b) must display a sufficiently low molecular weight for it to be liquid at room temperature.

According to the invention this resin has an epoxide equivalent weight of 150 to 220, preferably of 182 to 192.

The following compounds are used as amino-terminated polyethylen glycols (ATPEG) or polypropylene glycols (ATPPG):

1. linear amino-terminated polyethylene glycols (ATPEG) having the formula

in which n=17 to 27.

2. linear amino-terminated polypropylene glycols (ATPPG) having the formula

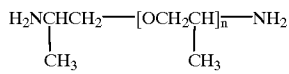

in which n is 5 to 100. They are obtainable under the trade name Jeffamine® of the D-series.

| Jeffamine ® Type | x | approx. molecular weight |
| --- | --- | --- |
| D-400 | 5–6 | 400 |
| D-2000 | 33 | 2000 |
| D-4000 | 68 | 4000 |

3. trifunctional compounds having the formula

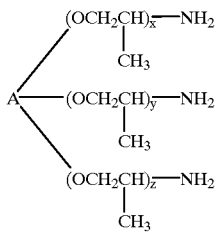

in which A is a $CH_3CH_2C(CH_2)_3\equiv$ or a

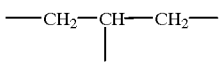

group and x, y and z independently of each other are 1 to 40 and x+y+z are preferably >6.

They are obtainable under the trade name Jeffamine® of the T-series.

| Jeffamine ® Type | A (initiator) | approx. molecular weight |
| --- | --- | --- |
| T-403 | trimethylol propane | 440 |
| T-3000 | glycerin | 3000 |
| T-5000 | glycerin | 5000 |

As already mentioned, the properties of the reactive hot melt adhesive can be controlled by varying the ratios of the resin components. According to the invention, 0,5 to 1 equivalent (30 to 50 wt-%) of epoxy resin a) which is solid at room temperature and 0,5 to 1 equivalent (10ito 25 wt-%) of epoxy resin b) which is liquid at room temperature are reacted with 0,125 to 0,5 equivalent (35 to 50 wt-%) of the amino-terminated polyethylene or polypropylene glycols, it being possible for 0.5 to 10 wt-% to be a trifunctional ATPPG. The heat-resistance of this cold-flexible resin component can be further improved by adding dimeric acid and/or butadiene-nitrile rubber/DGEBA or DGEBF adducts.

Suitable as thermally activatable latent curing agents are all compounds and mixtures of compounds which are known to be usable in epoxy resins for this purpose. When choosing, however, it is to be borne in mind that activation is to take place only at a temperature which lies clearly above the softening point of the reactive hot melt adhesive, i.e. at least approximately 50° C. above the softening point. This is necessary on the one hand with respect to the preparation of the reactive hot melt adhesive and, on the other hand, to its application. A preferred latent curing agent according to the invention is dicyanodiamide.

With the process according to the invention for preparing the reactive hot melt adhesive, the resin component is initially prepared in a first stage. To this end the solid epoxy resin a) and the liquid epoxy resin b) are reacted with the ETPEG or ATPPG c) in the desired ratio. The reaction takes place at high temperature, preferably at 90 to 130° C., for example at approximately 120° C., for a duration of e.g. three hours.

The resultant resin is solid or viscous at room temperature. It can be directly further processed to obtain the reactive hot melt adhesive. However, it is also possible to prepare the resin in advance and to store it until further processing.

For further processing, first of all it is necessary to heat the resin in order to lower its viscosity to such a degree that it can be mixed with the other constituents of the reactive hot melt adhesive. The resin is preferably heated to a temperature above 50° C., for example 60 to 110° C., particularly 70 to 95° C. Then the other modified resins are added and homogeneously mixed. It must be ensured that heating is not carried out to a temperature at which the added latent curing agent would be activated. For heating the resin and mixing with the other constituents of the reactive hot melt adhesive, a heatable kneader or planetary mixer is suitably used. It is preferred to incorporate the latent curing agent in the mixture last after the other constituents. It is further preferred to cool the mixture, prior to adding the latent curing agent, to a temperature at the lower limit of the temperature range which is suitable for processing.

The reactive hot melt adhesive according to the invention is suitable for glueing parts made of different materials. It is preferably used for the glueing of metal parts and particularly for the glueing of steel sheets. These can also be electro-galvanized, hot-dip galvanized or zinc/nickel-coated steel sheets.

The adhesive is usually deposited in the form of a melt on one side, i.e. onto one of the two parts which are to be glued together. Once again, it must be ensured that the adhesive is heated only up to a temperature at which the latent curing agent is not yet activated. The two parts are joined together immediately after deposition of the adhesive melt; upon cooling the adhesive sets and provisionally bonds the two parts to each other.

The resultant bond already has a certain strength. For example the still uncured adhesive is not washed out if the metal sheets which are provisionally bonded to each other are-treated for de-greasing purposes in a wash bath and then in a parkerizing bath.

The adhesive is finally cured in the oven at a temperature which lies clearly above the temperature at which the adhesive melt was applied to the parts to be bonded. Curing preferably takes place at a temperature above 150° C., for example at 180° C., for ca. 30 minutes.

The invention will be described in the following with reference to examples.

Unless otherwise emphasized, all quantities are given in parts by weight.

A product prepared from bisphenol A and epichlorhydrin was used in the examples as solid epoxy resin a). This has an average number molecular weight of approximately 900 to 1000. The epoxide group content was 1600 to 2200 mMol/kg, corresponding to an epoxide equivalent weight of approximately 450 to 600. The setting temperature (Kofler) of this solid epoxy resin was 50 to 70° C. At 25° C. the resin had a density of 1.19 g/ml. The liquid epoxy resin had an epoxide equivalent weight of 182 to 192. Its viscosity at 25° C. was 8,000 to 13,000 mpa·s. The density in this instance was 1.16 g/ml.

In the examples, products having an average molecular weight of approximately 2000 or 4000 were used as linear ATPPG. The activatable hydrogen equivalent was 500 or 1000. Porducts having an average molecular weight of about 440 to 3000 were used as trifunctional ATPPG. Their AHEW was about 73 to 500.

The viscosity values quoted in the examples were determined in a rheometer with a plate/plate measuring configuration at 0.1 s$^{-1}$. The tensile shearing strengths (TSS) quoted in the examples were measured as follows: cleaned, uncoated, deep-drawn sheets measuring 100×25×1 mm were glued, overlapping 12 mm, as per DIN 53281/53283. Coat thickness 0.3 mm. Curing: 30 min./180° C. Measurements were carried out at test temperatures of −40° C., +20° C. and +90° C. A further measurement was carried out at +20° C., after the sample in question had been subjected for 20 days to a salt-spray test according to DIN 50021.

The T-peel strength (TPS) quoted in the examples was measured according to DIN 53282. Layer thickness 0.3 or 3 mm. Curing: 30 min./180° C., drawdown rate v=25 or 2000 mm/min. The peel resistance ascertained from the plateau of the peel diagram is stated.

EXAMPLE 1

The reaction products of linear and trifunctional ATPPG with DGEBA can be prepared separately or in the mixture. Resins A to E were prepared from the following constituents, the formulation size being 1 kg in each case:

Preparation of modified epoxy resin
(in equivalents)

|  | EEW | AHEW | Test A | B | C | D | E |
|---|---|---|---|---|---|---|---|
| liquid DGEBA | 187 |  | 0.765 | 0.765 | 0.765 | 0.765 | 0.69 |
| Solid DGEBA | 475 |  | 0.765 | 0.765 | 0.765 | 0.765 | 0.692 |
| CTBN adduct | 325 |  | 0.17 | 0.17 | 0.17 | 0.17 |  |
| Dimeric acid adduct | 650 |  |  |  |  |  | 0.34 |
| Linear ATPPG |  | 1000 | 0.44 | 0.43 | 0.44 | 0.43 | 0.43 |
| trifunct. ATPPG |  | 500 | 0.08 | 0.023 |  |  | 0.013 |
| trifunct. ATPPG |  | 75 |  |  | 0.011 | 0.023 |  |
| Viscosity at +80° C. (Pa · s) |  |  | 36 | 37 | 28 | 33 | 34 |
| Theoret. epoxide equivalent weight EEW |  |  | ca.800 | ca.800 | ca.800 | ca.800 | ca.800 |

EXAMPLES 2 TO 7

The second group of adhesives (1A to 1E) were compounded according to the following table to form the finished adhesive and tested.

Adhesive preparation and testing
(Quantity data in equivalents)

|  | Versuch Nr. | | | | | |
|---|---|---|---|---|---|---|
|  | 2 | 3 | 4 | 5 | 6 | 7 |
| Resin type, % | A 60.0 | B 60.0 | C 60.0 | D 60.0 | C 60.0 | E 60.0 |
| AlMgK silicate | 24.9 | 24.9 | 24.9 | 24.9 | 25.4 | 24.9 |
| Carbon black | 13.0 | 13.0 | 13.0 | 13.0 | 13.0 | 13.0 |
| Phenurone paste | 0.1 | 0.1 | 0.1 | 0.1 | 0.1 | 0.1 |
| Dicyanodiamide | 2.0 | 2.0 | 2.0 | 2.0 | 1.5 | 2.0 |
| Viscosity (Pa · s) |  |  |  |  |  | 2.100 |
| TSS |  |  |  |  |  |  |
| −40° C. (MPa) | 16.8 ± 0.6 | 13.9 ± 1.4 | 16.7 ± 0.9 | 15.4 ± 1.3 | 14.4 ± 1.4 | 19.1 ± 2.1 |
| 0° C. | 11.3 ± 2.5 | 4.4 ± 0.5 | 11.3 ± 0.6 | 9.6 ± 0.6 | 9.2 ± 1.2 | 8.8 ± 1.5 |
| +90° C. | 4.6 ± 1.3 | 2.7 ± 0.9 | 4.9 ± 0.9 | 3.6 ± 1.2 | 4.1 ± 0.3 | 3.4 ± 1.1 |
| TPS (v = 2000 mm/min) (N/mm) | 53.0 ± 1.3 | 39.0 ± 4.2 | 57.0 ± 5.0 | 57.0 ± 3.7 | 51.0 ± 5.9 | 51.0 ± 5.7 |

-continued

Adhesive preparation and testing
(Quantity data in equivalents)

| | Versuch Nr. | | | | | |
|---|---|---|---|---|---|---|
| | 2 | 3 | 4 | 5 | 6 | 7 |
| TPS (v = 25 mm/min) (N/mm) | | | | | | |
| −30° C. | 44.0 ± 8.3 | | | | | 68.6 ± 10.3 |
| 0° C. | 36.7 ± 6.4 | | | | | 43.1 ± 5.2 |
| +90° C. | 14.5 ± 2.9 | | | | | 18.5 ± 3.1 |

Resin mixtures A to E were melted at approximately 80° C. and introduced first into the kneader with delivery screw. then the additional resin (CTBN adduct or dimeric acid adduct) was added and homogeneously mixed at 80° C.

The mineral filler AlMgK silicate, carbon black and dicyanodiamide were then added and homogeneously mixed. Finally, the phenuron accelerator paste was added. Mixing was carried out at 60 to 80° C. for 1 hour under vacuum. The product was extruded via the screw.

Abbreviations used herein are defined as follows:
CTBN carboxyl-terminated butadiene-nitrile rubber
ATPPG amino-terminated polypropylene glycol
ATEPG amino-terminated polyethlyene glycols
DGEBA diglycidyl ether of bisphenol A
DGEBF diglycidyl ether of bisphenol F
AEW amine equivalent weight
EEW epoxide equivalent weight
AHEW active hydrogen equivalent weight
TSS tensile shearing strength
TPS t-peel strength
DMTA dynamic-mechanical thermoanalysis

What is claimed:

1. A reactive hot melt adhesive composition comprising the reaction product of a thermally activatable latent curing agent with
   (a) about 0.5 to about 1 equivalent of an epoxy resin which is solid at room temperature prepared from bisphenol A or bisphenol F and epichlorohydrin having an epoxide equivalent weight of from about 400 to about 700,
   (b) about 0.5 to about 1 equivalent of an epoxy resin which is liquid at room temperature prepared from bispbenol A or bisphenol F and epichlorohydrin having an epoxide equivalent weight of from about 150 to about 220, and
   (c) about 0.125 to about 0.5 equivalent of an amino-terminated polyalkylene glycol selected from the group consisting of polyethylene and polypropylene glycols, wherein said epoxy resins (a) and (b) are present in an amount such that a stoichiometric excess of at least 1 equivalent of epoxy groups over the amino groups is provided, said amino-terminated polyalkylene glycol comprising
      i) a linear amino-terminated polyethylene glycol corresponding to formula I

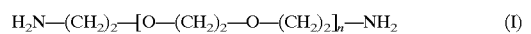

wherein n is a number from about 17 to about 27 or
   ii) a linear amino-terminated polypropylene glycol corresponding to formula II

wherein n is 40 to 200, with an average molecular weight of >2000, or,
   iii) a linear amino-terminated polyethylene glycol of the formula I in which n=17 to 27, or a linear amino-terminated polypropylene glycol of the formula II, in which n is 5 to 200, with an average molecular weight of >360, together with a trifunctional amino-terminated polypropylene glycol of the formula III

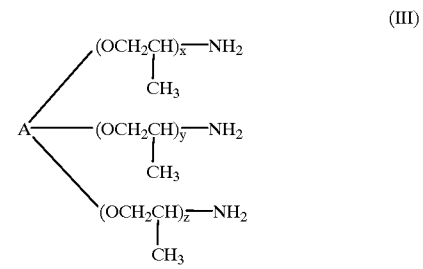

in which A is a —$CH_3CH_2C(CH_2)_3$ or a

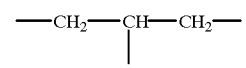

group and x, y and z independently of each other are 1 to 40, with an average molecular weight of >400, and wherein 4 to 40% of the epoxy equivalents of the total epoxy resin component are replaced by (a) an adduct of dimeric fatty acids on epoxy resins prepared from diglycidyl ethers of bisphenol A or F, or (b) an adduct of carboxyl-terminated butadiene-nitrile rubber on epoxy resins prepared from diglycidyl ethers of bisphenol A or F.

2. A composition as in claim 1 wherein said component (b) has an epoxide equivalent weight of from about 182 to about 192.

3. A composition as in claim 1 wherein said latent curing agent consists of dicyandiamide.

4. The process of preparing a reactive hot melt adhesive comprising reacting a thermally activatable curing agent with
   (a) about 0.5 to about 1 equivalent of an epoxy resin which is solid at room temperature prepared from bisphenol A or bisphenol F and epichlorohydrin having an epoxide equivalent weight of about 400 to about 700, (b) about 0.5 to about 1 equivalent of an epoxy resin which is liquid at room temperature, prepared from bisphenol A or bisphenol F and epichlorohydrin having an epoxide equivalent weight of from about 150 to about 200, and (c) about 0.125 to about 0.5 equivalent of amino-terminated polyethylene or polypropylene glycols, wherein said epoxy resins a) and b) are present in an amount such that a stoichiometric excess of at least 1 equivalent of epoxy groups over the amino groups is provided, said amino-terminated polyethylene or polypropylene glycol comprising (i) a linear amino-terminated polyethylene glycol corresponding to formula I

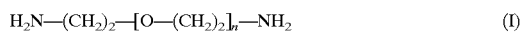

$$H_2N-(CH_2)_2-[O-(CH_2)_2]_n-NH_2 \qquad (I)$$

in which n=17 to 27, or (ii) a linear amino-terminated polypropylene glycol corresponding to formula II

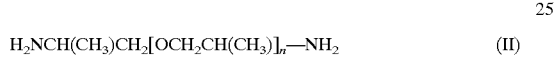

$$H_2NCH(CH_3)CH_2[OCH_2CH(CH_3)]_n-NH_2 \qquad (II)$$

in which n is 40 to 200, with an average molecular weight of >2,000, or (iii) a linear amino-terminated polyethylene glycol of the formula I in which n=17 to 27, or a linear amino-terminated polypropylene glycol of the formula II, in which n is 5 to 200, with an average molecular weight of >360, together with a trifunctional amino-terminated polypropylene glycol of the formula III

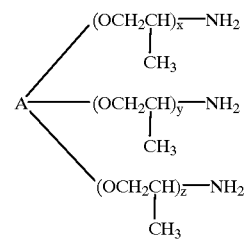

(III)

in which A is a $-CH_3CH_2C(CH_2)_3-$ or a

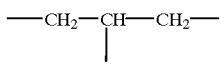

group and x, y and z independently of each other are 1 to 40, with an average molecular weight of >400 and wherein 4 to 40% of the epoxy equivalents of the total epoxy resin component are replaced by (a) an adduct of dimeric fatty acids on epoxy resins prepared from diglycidyl ethers of bisphenol A or F, or (b) an adduct of carboxyl-terminated butadiene-nitrile rubber on epoxy resins prepared from diglycidyl ethers of bisphenol A or F.

5. A process according to claim 4 wherein said curing agent is added as the last component.

6. A process according to claim 4 wherein said component (b) has an epoxide equivalent weight of from about 182 to about 192.

7. A process according to claim 4 wherein said curing agent consists of dicyandiamide.

8. A process according to claim 4 further including applying said reactive hot melt adhesive to steel parts.

* * * * *

UNITED STATES PATENT AND TRADEMARK OFFICE
CERTIFICATE OF CORRECTION

PATENT NO.   : 6,015,865
DATED        : January 18, 2000
INVENTOR(S)  : Blank et al.

It is certified that error appears in the above-identified patent and that said Letters Patent is hereby corrected as shown below:

Title page,
Item [57], ABSTRACT, delete "root" and insert therefor -- room --.

Column 7,
Line 48, delete "bispbenol", and insert therefor -- bisphenol --.

Column 8,
Line 40, delete "-$CH_3CH_2C(CH_2)_3$" and insert therefor -- $CH_3CH_2C(CH_2)_3 \equiv$ --.

Column 9,
Line 4, delete "from".
Delete formula (I) and replace with -- $H_2N\text{-}(CH_2)_2\text{-}[O\text{-}(CH_2)_2\text{-}O\text{-}(CH_2)_2]_n\text{-}NH_2$ --.

Column 10,
Line 13, delete "-$CH_3CH_2C(CH_2)_3$" and insert therefor -- $CH_3CH_2C(CH_2)_3 \equiv$ --.

Signed and Sealed this

Twelfth Day of October, 2004

JON W. DUDAS
*Director of the United States Patent and Trademark Office*